US008253533B2

(12) United States Patent
Jones

(10) Patent No.: US 8,253,533 B2
(45) Date of Patent: Aug. 28, 2012

(54) LOCKER SYSTEM AND METHOD

(75) Inventor: Matthew Preston Jones, Honolulu, HI (US)

(73) Assignee: Universal City Studios LLC, Universal City, CA (US)

( * ) Notice: Subject to any disclaimer, the term of this patent is extended or adjusted under 35 U.S.C. 154(b) by 363 days.

(21) Appl. No.: 12/570,362

(22) Filed: Sep. 30, 2009

(65) Prior Publication Data

US 2011/0074541 A1 Mar. 31, 2011

(51) Int. Cl.
*H04Q 5/22* (2006.01)

(52) U.S. Cl. ........................................................ 340/5.61

(58) Field of Classification Search ................. 340/10.1, 340/286.06, 573.1, 540; 70/276; 342/81; 235/382, 384
See application file for complete search history.

(56) References Cited

U.S. PATENT DOCUMENTS

| | | | | |
|---|---|---|---|---|
| 1,470,567 | A * | 10/1923 | Hasbrouck | 52/33 |
| 3,984,658 | A | 10/1976 | Cannon | |
| 5,074,135 | A * | 12/1991 | Eisermann | 70/276 |
| 5,231,272 | A | 7/1993 | Mardon | |
| 5,774,053 | A | 6/1998 | Porter | |
| 6,185,773 | B1 * | 2/2001 | Goedde | 340/540 |
| 6,690,673 | B1 * | 2/2004 | Jarvis | 370/401 |
| 6,989,753 | B1 * | 1/2006 | Lamming et al. | 340/573.1 |
| 7,068,149 | B2 * | 6/2006 | Lee et al. | 340/286.06 |
| 7,802,724 | B1 * | 9/2010 | Nohr | 235/384 |
| 2005/0040931 | A1 | 2/2005 | Shitan | |
| 2005/0110674 | A1 * | 5/2005 | Mendolia et al. | 342/81 |
| 2007/0018787 | A1 * | 1/2007 | Martinez de Velasco Cortina et al. | 340/5.61 |
| 2008/0191009 | A1 * | 8/2008 | Gressel et al. | 235/382 |
| 2009/0121836 | A1 * | 5/2009 | Mikan et al. | 340/10.1 |

FOREIGN PATENT DOCUMENTS

| | | |
|---|---|---|
| FR | 2805895 | 9/2001 |
| WO | 03034334 | 4/2003 |
| WO | 2007014151 | 2/2007 |

OTHER PUBLICATIONS

CedarPoint, 20080307, www.cedarpoint.com/public/park/ride Mar. 2008.*

International Search Report and Written Opinion for PCT/US2010/041779 mailed Nov. 5, 2010.

* cited by examiner

*Primary Examiner* — Jennifer Mehmood
*Assistant Examiner* — Kaleria Knox
(74) *Attorney, Agent, or Firm* — Fletcher Yoder

(57) ABSTRACT

The present disclosure describes a system for managing a plurality of lockers proximate a theme park attraction, the system having an electronically actuated lock disposed on the plurality of lockers, a guest identifier carriable on the guests person, the identifier usable as an electronic key configured to lock and unlock the lock, an egress sensor positioned at an exit of the theme park attraction and a processor in communication with the lock and the egress sensor and configured to unlock the lock subsequent to being signaled by the egress sensor. A method for using and managing a plurality of lockers is also described.

28 Claims, 4 Drawing Sheets

LOCKER SYSTEM AND METHOD

BACKGROUND

The present invention relates to a locker system and method. More particularly, the present invention relates to an electronic locker system for servicing a plurality of guests at a theme park.

Most theme parks, particularly those with water-based attractions and inverted rides, request that guests store any loose belongings, such as pocket change or purses, in a locker during ride use. Conventional lockers systems typically include columns and rows of lockers located proximate the ride vehicle, or as its own separate room. In these instances, guests may be given a specific key and locker number to store items that may be dangerous if they became dislodged.

Operators of theme parks will typically provide guests, free of charge, a predetermined amount of lockers proximate the ride so that before boarding a ride, a guest can store loose items, and upon exiting the ride, can retrieve said items. However, some guests may take advantage of the free service and leave their items in the locker until they leave the park, thereby preventing other guests from utilizing the service, which increases safety concerns.

Electronic locker systems have been developed to obviate the need for a traditional metal keys. For example, U.S. Pat. No. 3,984,658 describes an access control device operated by a magnetically coded card. In this example, a self-contained unit with card receiving slot, card reader, memory and logic and control circuitry communicate, each issued card having a unique number and a programmable memory providing storage for the code of each card permitted access and of each card the permission of which is subsequently voided.

Locker systems have also been developed that utilize remote controls for locking and unlocking at a distance. For example, U.S. Pat. No. 6,185,773 describes a locker having a key pad transmitter for activating a locking and opening mechanism, and a sound-making device in order to help a visually impaired student. It also describes a solenoid actuated remote control locking mechanism having release levers which urge the locker door's latch pins off of their corresponding latches. One electrical circuit is used for the locking mechanisms and the door-opening device, and a different circuit is used for the beeping function of the locker.

Lockers that communicate have also been described for example, in U.S. Pat. No. 5,231,272, which describes a storage system with adjacent lockers comprising a keyboard-visualizing display screen connected to a microprocessor device enabling an attendant to record the identity of a user. It also includes a dispenser device for delivering to the user a ticket onto which are stored at least the number of the locker assigned to the user and his identity and a device associated with each locker for receiving and reading the ticket, the system being applicable in railway stations or airports.

However, the above-described systems do not control when a person uses the locker, and are typically expensive to implement. Furthermore, the above-described systems may be complicated to some persons and do not provide for notification in case of improper use.

Accordingly, to date, there is no suitable system or method to operate a plurality of electronic locker systems.

BRIEF DESCRIPTION

The present disclosure describes a system and method for managing theme park ride lines.

In a first embodiment, the invention provides a system for managing a plurality of lockers proximate a theme park attraction, the system comprising an electronically actuated lock disposed on the plurality of lockers, a guest identifier carriable on the guests person, the identifier usable as an electronic key configured to lock and unlock the lock, an egress sensor positioned at an exit of the theme park attraction and a processor in communication with the lock and the egress sensor and configured to unlock the lock subsequent to being signaled by the egress sensor.

In a second embodiment, the invention provides a method for using a plurality of lockers proximate an attraction, the lockers being lockable via either a guest identifier or a lock control system, the method comprising providing a guest identifier to each guest, placing guest's belongings in one of the plurality of lockers, using the guest identifier to lock and unlock the one of the plurality of lockers, signaling the guest to retrieve the guest belongings through the use of an egress sensor at an exit of an attraction, and separately unlocking any one of the plurality of lockers that a guest did not unlock via the control system.

Other features and advantages of the disclosure will become apparent by reference to the following description taken in connection with the accompanying drawings.

BRIEF DESCRIPTION OF THE DRAWINGS

Reference is now made briefly to the accompanying drawings, in which.

Like reference characters designate identical or corresponding components and units throughout the several views, which are not to scale unless otherwise indicated.

DETAILED DESCRIPTION

One embodiment of the present invention involves a system and method for managing a plurality of lockers proximate a theme park attraction. One particular advantage afforded by this invention is ability to control a persons use of a locker, thereby affording others use of the lockers when necessary (e.g., during a roller coaster ride). Another advantage afforded by this invention is making easier for a guest to use a service (i.e., lockers for loose items) which is designed to protect the guest, thereby increasing the amount of guests that use the service, and decreasing the chance of injury due to loose items falling from guests and becoming dangerous projectiles.

Specific configurations and arrangements of the claimed invention, discussed below with reference to the accompanying drawings, are for illustrative purposes only. Other configurations and arrangements that are within the purview of a skilled artisan can be made, used, or sold without departing from the spirit and scope of the appended claims. For example, while some embodiments of the invention are herein described with reference to a theme park, a skilled artisan will recognize that embodiments of the invention can be implemented at the security desk of an office building, courthouse or sporting event, and restaurants or schools in which storing items for a short period of time is desirable.

As used herein, an element or function recited in the singular and proceeded with the word “a” or “an” should be understood as not excluding plural said elements or functions, unless such exclusion is explicitly recited. Furthermore, references to “one embodiment” of the claimed invention should not be interpreted as excluding the existence of additional embodiments that also incorporate the recited features. As used herein non-limiting examples of a “theme park attraction” may comprise a rollercoaster type vehicle, a log flume, a scrambler type vehicle, a free fall, or any vehicle that moves at a speed in which loose items may fall off a guest. Furthermore, a theme park attraction may comprise shows and the like. Please note, as used herein, the terms “attraction” and “ride” are use interchangeably.

Figure 1:
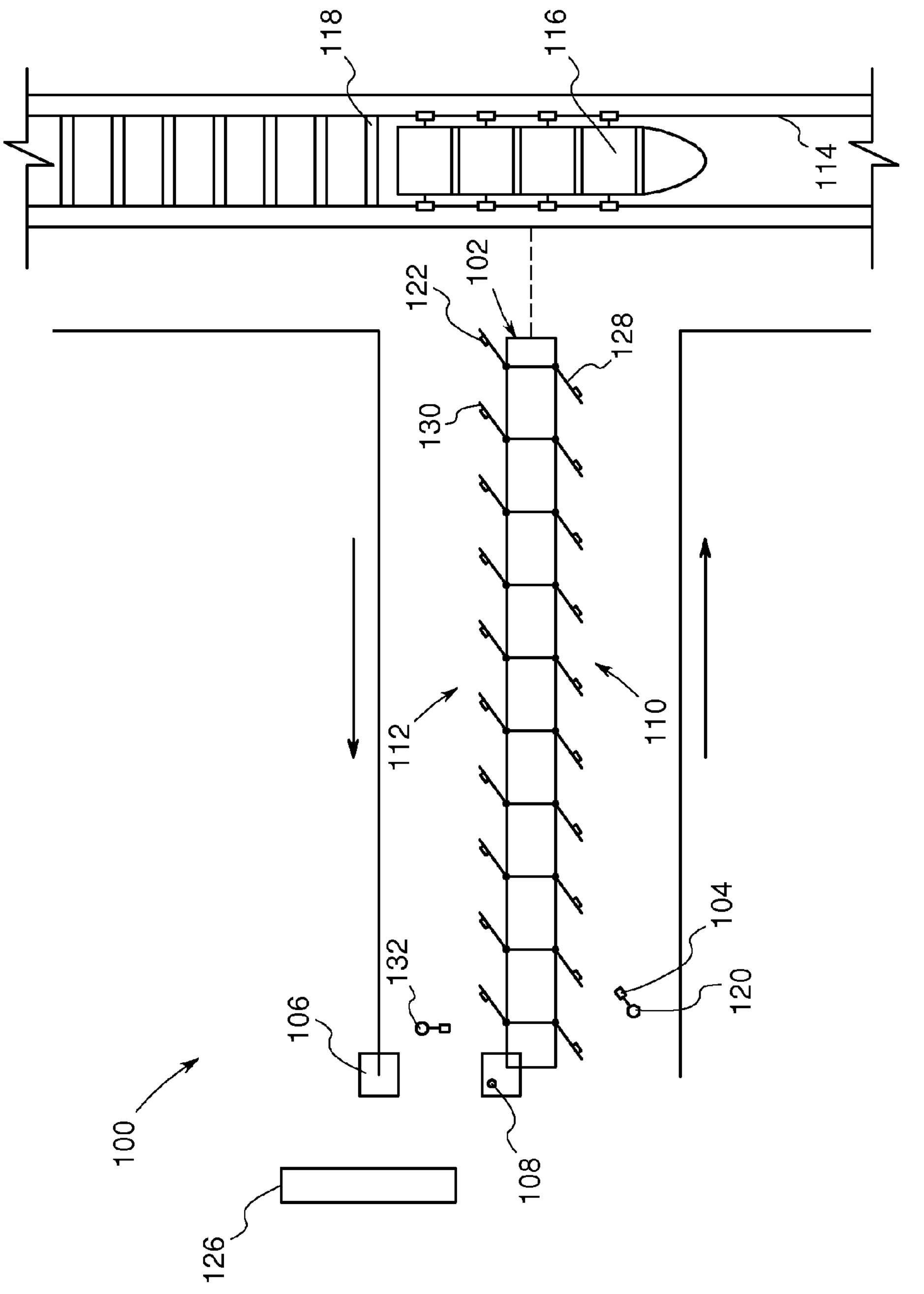
FIG. 1 is a top view of a system for managing a plurality of lockers proximate a theme park attraction to which embodiments of the present invention relate.

Referring now to FIG. 1, a system for managing a plurality of lockers proximate a theme park attraction is shown generally at reference numeral 100. The system may comprise a plurality of lockers 102, a guest identifier 104, and an egress sensor 106 and a processor 108.

In one embodiment of the present invention, the plurality of lockers 102 comprise rows and columns of lockers integrated into or located adjacent attraction line queues 110 and 112 with line queue 110 comprising an entrance line queue and line queue 112 comprising an exit line queue. The attraction may be a rollercoaster 114 comprising a ride vehicle 116 disposed on tracks 118. Typically, the plurality of lockers 102 may be located proximate theme park attractions that travel at such a speed, or become so inverted, that loose items possessed by a guest may become dislodged.

Referring still to FIG. 1, a guest 120 is shown carrying a guest identifier 104. The guest identifier 104 may be carriable on the guests person, and usable as an electronic key configured to both unlock and lock an electronically actuated lock 122 disposed on each of the plurality of lockers 102. As the guest 120 approaches the ride 114, theme park operators may place a sign 126 insisting that guests place all loose items in one of plurality of lockers 102 as they pass through the entrance line queue 110. Loose items may include, for example, cellular phones, pocket change, wallets, extra layers of clothes not being worn, hats or purses. After placing the items in one of the plurality of lockers 102, the guest identifier 104 may be used as an electronic key to actuate the electronic lock thereby locking the locker with their belongs and prepare to board the ride 114.

Figure 2:
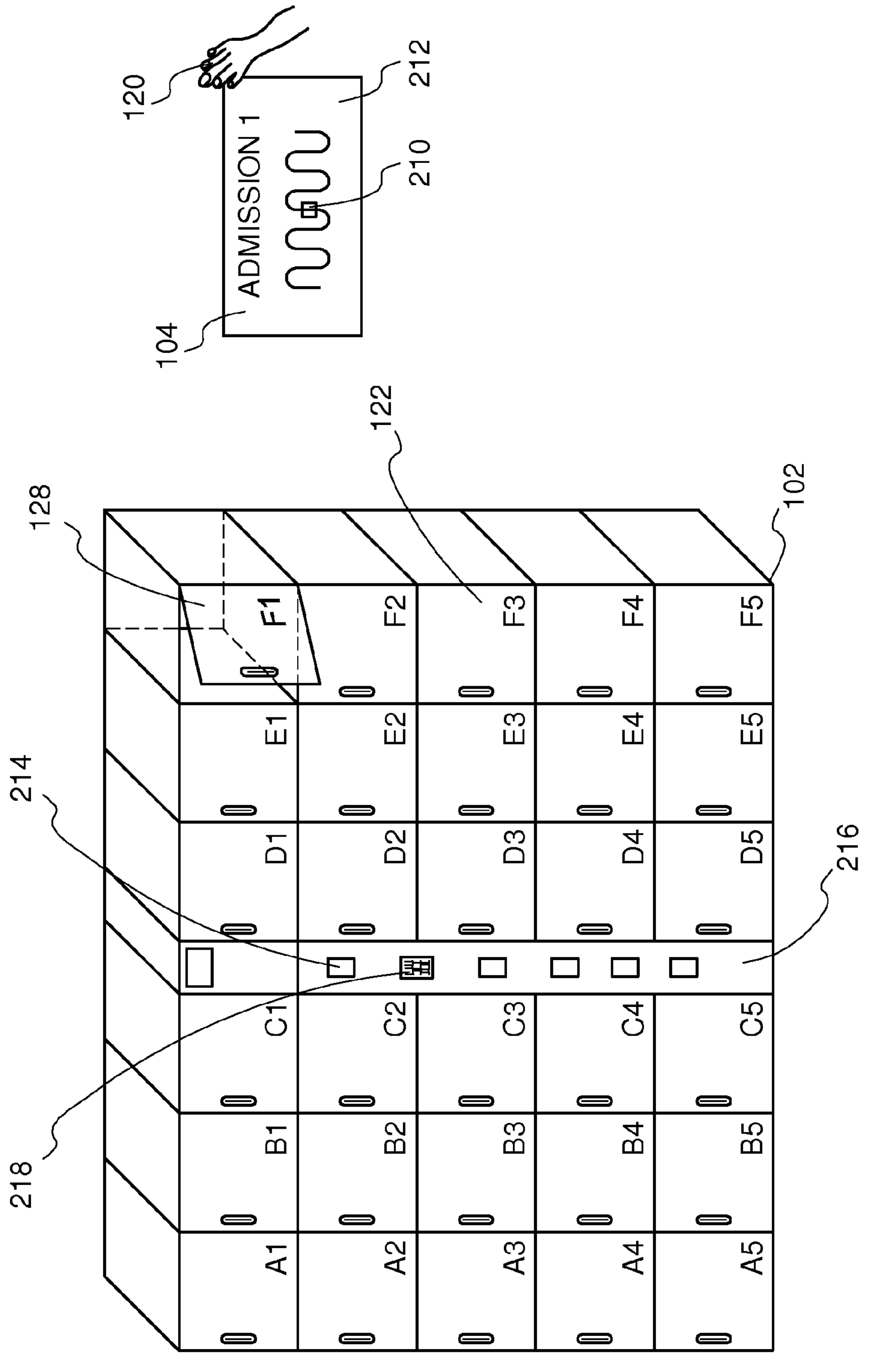
FIG. 2 is a front view of a plurality of lockers and sensors in accordance with an embodiment of the present invention.

In this regard, with reference to FIG. 2, the guest identifier 104 may comprise an RFID tag 210 embedded in a ticket (e.g., a one day park pass) 212. For example, as a guest 120 enters a theme park, the theme park operator, such as at a ticket window, may furnish the guest 120 with a guest identifier 104. Each identifier 104 may be configured to uniquely identify each guest 120. In this exemplary embodiment, automatic identification and data capture (AIDC) devices such as radio frequency identification tags (RFIDs) are used. Other guest identifying devices usable with the present invention may include bar-coded tickets, magnetic strip tickets, pin numbers, cellular phone identifiers, hotel room keys, and credit cards. Any guest identifying device, or combination of guest identifying devices may have a reciprocal device reader that communicates with the guest identifier 104.

Referring still to FIG. 2, the plurality of lockers 102 may comprise RFID readers 214 disposed in a center console 216 of the plurality of lockers 102. The readers 214 may be electrically connected to the locks 122 and send a signal to one of the locks 122 when a corresponding RFID tag reaches a predetermined distance to lock the locker door 128. In this way, after a guest 120 places loose belongings in the locker, the ticket 212 and may be waived in front of the reader 214, which then signals the lock 122 to move to a lock position. Optionally, each locker A1-F5 may comprise its own RFID reader 214 that are located on the face of each locker A1-F5, and are configured to communicate with RFID tags 210 embedded in the ticket 212. The plurality of lockers 102 may further comprise a locker control system comprising central keypad 218. The central keypad 218 may be electrically connected to each of the plurality of lockers 102 and is configured to allow a guest to type in their particular locker number A1-F5, thereby allowing the guest to access their particular number locker with use of the RFID tag 210.

Referring back to FIG. 1, the each of the plurality of lockers 102 comprise a pair of access doors 128 and 130 on opposing sides of each locker. In this embodiment, the lockers do not contain a partition so that each guest can access his or her single locker from both the entrance line queue and the exit line queue. In this way, an exiting guest 132 can efficiently pick up his or her loose belongings after the attraction ends. However, some guests may not pick up their belongings, choosing to leave them in the locker until the day ends to avoid any perceived hassle. Therefore, the invention provides an egress sensor 106 positioned at an exit of the theme park attraction described in detail below.

Figure 3:
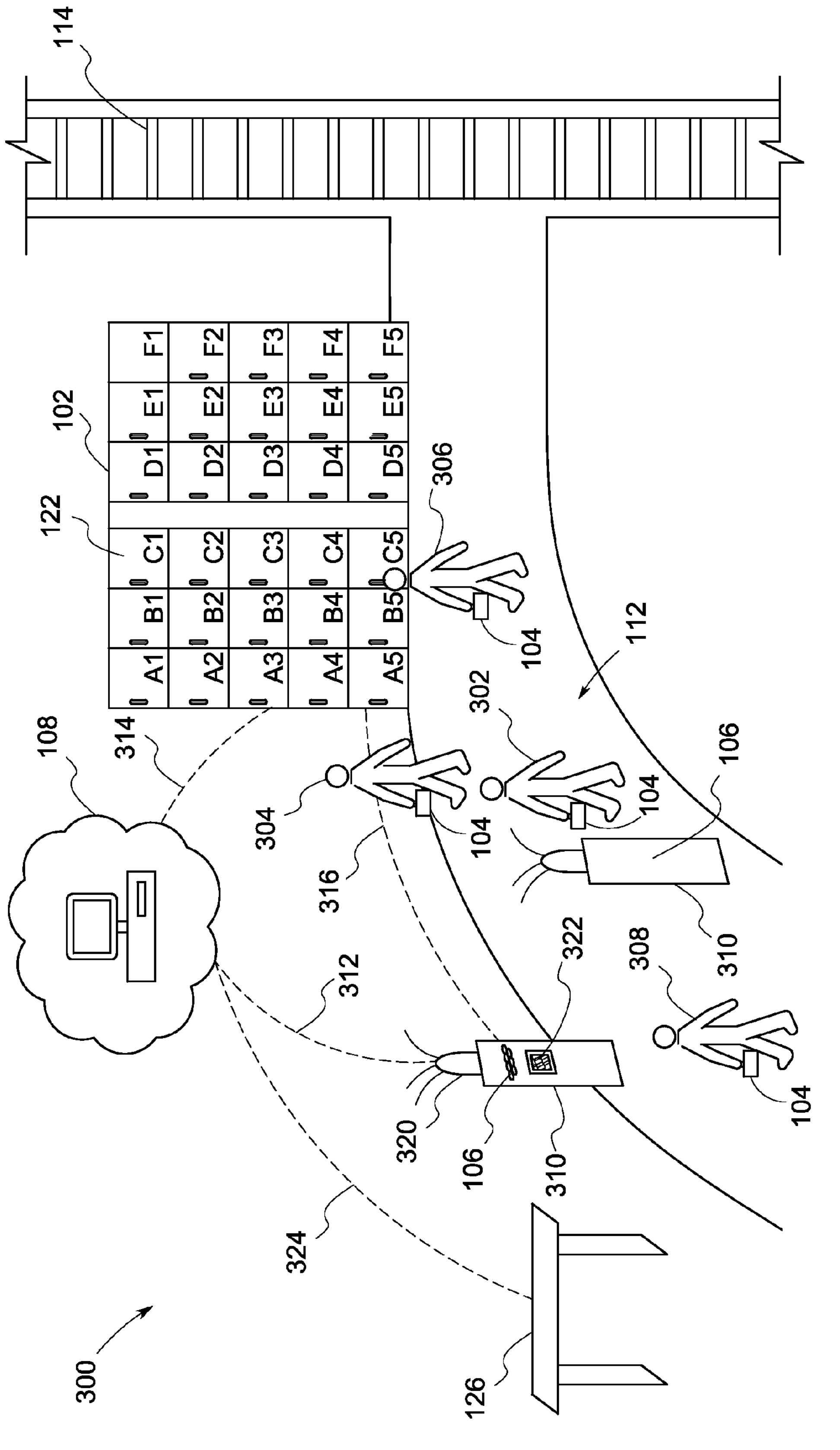
FIG. 3 is a perspective view of the system FIG. 1 to which embodiments of the present invention relate.

With reference now to FIG. 3, a perspective view of a system for managing a plurality of lockers proximate a theme park attraction is shown generally at 300. As shown, the system may comprise a plurality of lockers 102, a guest identifier 104, an egress sensor 106, and a processor 108.

In this exemplary embodiment of the present invention, guests 302-308 are progressing down the exit line queue 112 after riding on roller coaster attraction 114. The processor 108 may be disposed in checkpoint markers 310, may be located a main control station of the theme park (e.g., a control hub) or disposed in the plurality of lockers 102. The processor 108 may be in communication with each of the egress sensors 106 and the electronically actuated lock 122 via a park network system comprising hard-wired LAN networks or wireless communication (e.g., Wi-Fi, Bluetooth™, etc.) as shown by dashed lines 312, 314, and 316. The main processor 106 may comprise the main hardware system components (e.g., hard disc storage and networking components) together with main software components for a plurality of execution functions such as data storage and data retrieval. Guest identifiers 104 together with device readers 218 and the egress sensors 106 may act as an interface between park guests and the network.

The egress sensor 106 may comprise an array of sensors disposed in checkpoint markers 310, which may be located on each side of the exit line cue path 312. The checkpoint markers 310 may be placed in such a way as to be sure that all guests exiting the ride will pass in between the pair of checkpoint markers. The egress sensors 106 may comprise motion sensor and/or RFID readers that communicate with the guest identifier (e.g., RFID tag). In an exemplary embodiment of the present invention, sensors comprise RFID readers. In operation, when a guest 302-308 walks through checkpoint markers 310, the egress sensor 106 is configured to send a signal, either through processor 108 or directly to signaling devices 320 and 322 to remind guests to pick up their items out of the lockers 102.

Signaling device 320 may comprise a beacon 320 (e.g., signal lights) mounted to the top of the checkpoint markers 310. The beacon 320 may comprise a light emitting diode (LED) or an array of light emitting diodes having different color lenses to provide a visual indication of the different messages being conveyed, if desired. Beacon 320 may flash or pulse to draw the attention of the guests to the visual signal, or to convey a particular message. Signaling device 322 may comprise an audio signaler 322 having a speaker mounted on the front face or front panel of the checkpoint markers 320 in addition to, or instead of, beacon 320. The audio signaler 322 may be a horn or buzzer, or may include a speech synthesizer for conveying short, standard voice signals, such as "please do not forget to pick up your belongings from your locker". The audio signaling device may be used in conjunction with the visual signaling device, e.g., the beacon 320 may illuminate as the guest passes through, and the audio signaling device may convey desired messages. Another exemplary message to be conveyed may remind guests that an operator may retrieve their belongings from their locker if they do not. However, it should be noted that the number of visual signals, their location, their configuration, and the signal being conveyed by illumination of the visual signals may vary within the scope of the invention. For example, in an optional embodiment of the present invention, a sign 126 may be used as the visual signal. In this embodiment, the processor 108 may be in communication with the sign 126 via line 324, and send a signal to an array of diodes located on the sign to convey a desired message to a guest.

Referring still to FIG. 3, guest 308 has walked through checkpoint markers 320 and by the egress sensors 106. The egress sensors 106 are configured to signal the processor 108 that a guest carrying a particular identifier has walked through. The processor 108 may then signal the operator that a guest using a known locker has passed by the egress sensors 106 without picking up their belongings. At this time, the processor may alert the operator, via a control panel for example, to pick up the belongings that the guest forgot, while alerting the operator as to the specific locker the guests belongings are in. For anti-theft protection, the locker may remain locked until the operator retrieves the belongings. In this way, if a guest 302-308 has used one of the plurality of lockers, when they pass through the egress sensor 106, the operator may be notified as to which locker still contains belongings, and retrieve them. The operator of the attraction can then empty the locker 102 so that a different guest has the opportunity to use the locker before boarding the attraction 114. Optionally, the each of the plurality of lockers 102 may comprise sensors configured to sense if objects have been left in the locker after they have passed through the egress sensors. If so, the sensor may signal the operator to unlock the electronically actuated lock 122.

Figure 4:
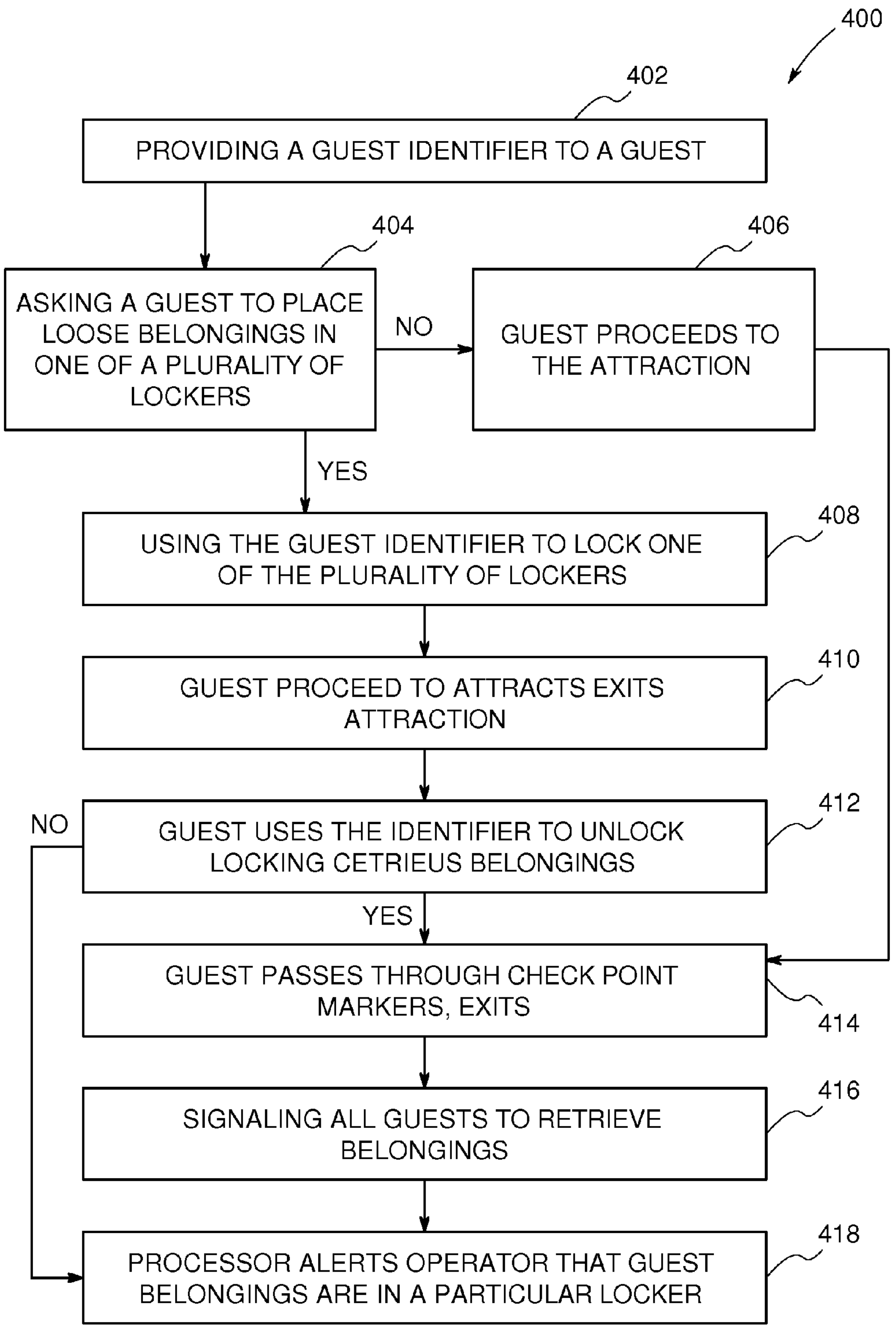
FIG. 4 is flow chart describing a step-wise method in accordance with a further embodiment of the present invention.

Referring now to FIG. 4, there is shown a flow chart to better help illustrate a method for managing a plurality of lockers proximate a theme park attraction generally at reference numeral 400. While the flowchart shows an exemplary step-by-step method, it is to be appreciated that a skilled artisan may rearrange or reorder the steps while maintaining like results.

Providing a guest identifier to a guest step 402 may comprise providing the guest an RFID tag embedded in a ticket (e.g., a one day park pass). For example, as discussed with reference to FIG. 1, a guest may enter a theme park and a theme park operator may furnish the guest an RFID tag or, optionally, a bar-coded ticket, magnetic strip ticket, a pin numbers, cellular phone identifier, or the like.

If a guest chooses to board an attraction that has the potential to eject or propel loose objects the guest may be carrying, the theme park operator may ask, via visual or audio transmission, that the guest place all loose belongings in a locker provided by the theme park step 404. In an embodiment of the present invention, the park may provide a plurality of lockers located in between a entrance line queue and an exit line queue, such as one shown in FIG. 1, having dual opening access panels facing each line queue. If the guest does not have loose items, or chooses to ignore the park operators request, the guest may proceed to the attraction step 406.

If a guest does choose to place his or her belongings in the dual sided lockers, he or she may use the guest identifier provided (e.g., on the admission ticket) to lock the locker door step 408 via an actuated electronic lock signaled by an RFID reader disposed on the plurality of lockers, which corresponds toe the guests RFIP tag. A guest may then proceed to the attraction step, enjoy the attraction, and proceed to exit the attraction step 410.

As the guest passes through the exit line queue, he or she may use the identifier to unlock the locker step and retrieve their belongings 412, via the actuated electronic lock signaled by an RFID reader disposed on the plurality of lockers, which corresponds to the guests RFIP tag. As the guest passes continues down the line queue, he or she will pass through a pair of checkpoint markers having an array of egress sensors disposed therein. Because the guest will still have the identifier on their possession, the egress sensors may be configured to recognize the identifier. For example, as discussed with reference to FIG. 3, the egress sensor may comprise motion sensors and/or RFID readers that communicate with the guest identifier (e.g., RFID tag responding to an RFID reader). When a the guest does walk through the checkpoint markers step 414, the egress sensors are configured to send a signal to a beacon and/or audio signaling device which, in turn, signals all guests to retrieve their belongings step 416. This may occur via a voice synthesizer asking guests to retrieve all belongings coupled with a flashing beacon. Optionally, a sign may be used as the visual signal. It should be noted that even if a guest did not use the locker, he or she may also be reminded to pick up all things from the locker. Alternatively, the sensors may recognize only those guests who actually used the locker and remind only them.

After all guests have been asked to remove their items, and have passed through the checkpoint markers, the processor may alert the operator that a guests belongings are in a particular locker step 418. In this way, if a guest has used one of the plurality of lockers, when they pass through the egress sensor their corresponding operator will know which locker to go to and retrieve the belongings so that a different guest has the opportunity to use the locker before boarding the attraction. Optionally, each of the plurality of lockers may comprise sensors configured to sense if objects have been left in the locker after they have passed the egress sensors. If so, the operator may retrieve the belongings.

Although specific features of various embodiments of the invention may be shown in some drawings and not in others, this is for convenience only. In accordance with the principles of the invention, the feature(s) of one drawing may be combined with any or all of the features in any of the other drawings. The words "including", "comprising", "having", and "with" as used herein are to be interpreted broadly and comprehensively and are not limited to any physical interconnection. Moreover, any embodiments disclosed herein are not to be interpreted as the only possible embodiments. Rather, modifications and other embodiments are intended to be included within the scope of the appended claims.

What is claimed is:

1. A system, comprising:

a plurality of lockers positioned within a theme park attraction area including an attraction;

an electronic lock disposed on at least one of the plurality of lockers, wherein the electronic lock is configured to be electronically actuated by a guest identifier that is carriable by a guest;

an egress sensor positioned at an exit of the theme park attraction area and configured to detect the guest identifier within an area proximate the egress sensor, wherein the plurality of lockers are positioned between the attraction and the egress sensor; and a processor in communication with the electronic lock and the egress sensor, the processor configured to alert an operator when the egress sensor detects the guest identifier while the electronic lock has not been actuated to facilitate removal of an object stored in the at least one of the plurality of lockers after an initial actuation of the electronic lock to facilitate storage of the object in the at least one of the plurality of lockers.

2. The system of claim 1 further comprising at least one signaling device configured to communicate a message to an exiting guest.

3. The system of claim 2, wherein the signaling device comprises an array of light emitting diodes configured to flash a message to the exiting guest or a speaker configured to emit an audio signal in response to a signal from the processor.

4. The system of claim 1, wherein the egress sensor is configured to signal the processor when the guest identifier comes within a predetermined distance of the egress sensor and an object sensor is configured to signal the processor when the object sensor detects the presence of the object remaining in the at least one of the plurality of lockers.

5. The system of claim 1, wherein when the guest identifier is detected by the egress sensor, the egress sensor subsequently signals, through the processor, the electronic lock to be in an unlock state.

6. The system of claim 1, comprising the guest identifier, wherein the guest identifier comprises an RFID tag embedded in an entrance ticket, a barcode ticket, a magnetic strip ticket, a pin number, a credit card, or a cellular phone identifier.

7. The system of claim 1, wherein each of the plurality of lockers comprises a pair of access doors on opposing sides of the locker, a first access door facing an entrance of the theme park attraction area and a second access door facing the exit of the theme park attraction area.

8. The system of claim 1, wherein each of the plurality of lockers comprises an RFID reader configured to receive a signal from the guest identifier, the RFID reader further configured to signal the electronic lock into a lock or unlock state.

9. The system of claim 1, wherein the egress sensor comprises an array of sensors positioned at the exit of the theme park attraction area.

10. The system of claim 1, further comprising a central keypad in communication with each of the plurality of lockers and configured to unlock the plurality of lockers based on authorized access.

11. A method, comprising:

receiving a guest's belongings in one of a plurality of lockers positioned within an attraction area between an attraction and an exit to the attraction area;

actuating a lock on the one of the plurality of lockers upon activation of a detector by a guest identifier;

detecting the guest identifier via an egress sensor positioned proximate the exit to the attraction area;

determining whether the lock on the one of the plurality of lockers has been unlocked and whether an object sensor indicates that the guest's belongings are present in the one of the plurality of lockers; and signaling, with a signaling device, that the guest's belongings should be retrieved when the one of the plurality of lockers has not been unlocked at the time the guest identifier is detected via the egress sensor and the object sensor has indicated the guest's belongings as being present in the one of the plurality of lockers.

12. The method of claim 11, further comprising the step of utilizing the guest identifier to unlock one of the plurality of lockers as the guest leaves the attraction.

13. The method of claim 11, further comprising requiring placement of all loose belongings in one of the plurality of lockers upon entering an entrance cue of the attraction.

14. The method of claim 11, further comprising providing an electronically actuated lock disposed on each of the plurality of lockers.

15. The method of claim 11, further comprising communicating between the lock and the egress sensor with a processor configured to lock or unlock the lock when signaled by the egress sensor.

16. The method of claim 11, wherein the processor alerts an operator that a guest has passed through the egress sensor without retrieving the guest's belongings from the one of the plurality of lockers.

17. The method of claim 11, wherein signaling comprises activating an array of light emitting diodes configured to flash a message to a guest in response to a signal from a processor.

18. The method of claim 11, wherein signaling comprises activating a speaker configured for emitting an audio signal to a guest in response to a signal from the processor.

19. The method of claim 11, wherein when the guest identifier signals the egress sensor, the egress sensor subsequently signals, through the processor, the lock to be in a lock or an unlock state.

20. The method of claim 11, wherein the guest identifier comprises an RFID tag embedded in an entrance ticket, a barcode ticket, a magnetic strip ticket, a pin number, a credit card, or a cellular phone identifier.

21. The method of claim 11, wherein receiving the guest's belongings comprises receiving the guest's belongings via a first access door of a pair of access doors on opposing sides of the locker, the first access door facing an entrance of the attraction area and a second access door facing the exit of the attraction area.

22. The method of claim 11, wherein actuating the lock on the one of the plurality of lockers upon activation of the detector by the guest identifier comprises activation of an RFID reader configured to receive a signal from the guest identifier.

23. The method of claim 11, wherein detecting the guest identifier via the egress sensor comprises detecting the guest identifier with an array of sensors.

24. The method of claim 11, comprising actuating the lock via a central keypad in communication with each of the plurality of lockers.

25. A method, comprising:

receiving an object into a locker via a first door facing an entrance queue to an attraction within an attraction area;

actuating a lock on the locker upon detection of an identifier;

detecting the identifier proximate an exit to the attraction area with an egress sensor;

determining, with a processor, whether the lock is unlocked via a lock sensor and whether the object has been removed from the locker via an object sensor;

activating an alert message, with the processor, when the lock has not been unlocked when the identifier is detected proximate the exit and the object has not been removed.

26. The system of claim 1, comprising a signaling device configured to communicate a message to an exiting guest in response to a signal from the processor, wherein the processor is configured to provide the signal when the guest identifier is detected by the egress sensor and the at least one of the plurality of lockers corresponding to the guest identifier has not been emptied.

27. The system of claim 1, wherein the processor is configured to provide an identity of the electronic lock corresponding to the guest identifier to the operator.

28. The method of claim 11, further comprising providing an operator with an identity of the one of the plurality of lockers.

* * * * *